United States Patent [19]

Greene

[11] 4,098,392
[45] Jul. 4, 1978

[54] POTATO CHIPS PROCESSING MACHINE

[76] Inventor: William F. Greene, Rte. 1, Hull, Ga. 30646

[21] Appl. No.: 735,826

[22] Filed: Oct. 26, 1976

[51] Int. Cl.² .............................................. B65B 35/30
[52] U.S. Cl. ...................................... 198/425; 53/159
[58] Field of Search ....................... 198/425, 423, 462; 53/26, 159

[56] References Cited

U.S. PATENT DOCUMENTS

| Re. 27,765 | 10/1973 | Salomon | 198/425 |
|---|---|---|---|
| 2,650,010 | 8/1953 | Moore | 198/425 |
| 3,190,434 | 6/1965 | Dardaine | 198/425 |
| 3,315,783 | 4/1967 | Nadherny | 198/425 |
| 3,402,803 | 9/1968 | Griner | 198/425 |
| 3,417,540 | 12/1968 | Copping et al. | 198/425 |
| 3,609,939 | 10/1971 | Hooper et al. | 53/159 |
| 3,677,391 | 7/1972 | Schaeffer | 198/462 |
| 3,760,557 | 9/1973 | McIntyre | 198/425 |
| 3,826,348 | 7/1974 | Preisig et al. | 198/425 |
| 3,851,748 | 12/1974 | Garton | 198/425 |
| 3,930,572 | 1/1976 | Fluck et al. | 198/425 |
| 3,988,875 | 11/1976 | Fay | 53/159 |

FOREIGN PATENT DOCUMENTS

2,259,769  8/1975  France .................................. 198/425

Primary Examiner—Evon C. Blunk
Assistant Examiner—Richard K. Thomson
Attorney, Agent, or Firm—Jones, Thomas & Askew

[57] ABSTRACT

Concave potato chips are arranged in edge standing, nested, aligned relationship, with their rectilinear dimensions extending upwardly, and the line of potato chips is moved along its length toward a packaging apparatus. Juxtaposed separator blades are inserted downwardly into the line of potato chips as the blades move with the line of potato chips, and the blades are moved apart to form a gap in the line and therefore create separate groups of potato chips as the potato chips move to the packaging apparatus.

7 Claims, 8 Drawing Figures

POTATO CHIPS PROCESSING MACHINE

BACKGROUND OF THE INVENTION

In the past, potato "chips" or "crisps" have been formed in random sizes and shapes and have been sold in bags, such as cellophane bags. Packaging of potato chips in this way requires a relatively large amount of space to contain a relatively small weight of potato chips, and the potato chips frequently become broken and crushed when any weight or force is applied to the exterior of the bag.

The newer type "potato chips" are of substantially uniform size and shape and are manufactured by mixing potato flour and other elements together, forming the mixture in a continuous flat sheet, moving the sheet toward a cooker, cutting out the oblong shapes from the sheet and then submerging the shapes into hot oil which cooks the chips. The chips tend to float in the hot oil and move up into contact with the transporting conveyor, causing the chips to curve around the shape of the conveyor, so that when the chips emerge from the oil they are substantially uniformly shaped with an eliptical outside edge, a concave face, and with one rectilinear dimension. The uniformity of shape and size of the new style potato chip allows a multiple number of the chips to be stacked in a nested relationship in a line, and the chips can be wrapped in this dense configuration in a soft package or inserted into a hard canister, etc. The package formed by the uniformly shaped, nested potato chips is much smaller in size and more densely packed than the old style bagged random shaped chips.

While the uniformity of size and shape in the new type potato chip is advantageous from a packaging standpoint, the procedures for wrapping or packaging the potato chips still requires a substantial amount of hand labor. For instance, the potato chips are typically moved to a large work table in several rows of shingle stacked chips, and several people at the work table are required to gather the potato chips and transfer them to a conveyor which includes upstanding pins at spaced intervals along its length which holds the potato chips in "slugs" or groups that can be separately packaged. The manual step of gathering and then transferring the potato chips to the conveyor results in each package of potato chips having a different number of chips in the package. Moreover, a substantial amount of potato chip breakage is experienced in the manual transfer procedure, and if a package is overfilled or underfilled, breakage of the chips is likely to occur in the package.

SUMMARY OF THE INVENTION

Briefly described, the present invention comprises a potato chip processing system which separates a line of nested potato chips into smaller groups or "slugs" and moves the groups of chips on toward a packaging machine. The potato chips are arranged in a nested, edge standing, aligned relationship with respect to each other and the line of potato chips is moved by a conveyor toward a packaging system. A pair of juxtaposed separator blades move along the path of movement of the potato chips and are guided downwardly into the potato chips. After the blades have been inserted between adjacent ones of the potato chips the blades move apart from each other to create a space in the line of potato chips and therefore separate the line of potato chips into groups of potato chips and the separated blades continue to move the potato chips progressively on toward the packaging machine where they are wrapped in separate groups.

The separator elements comprise a pair of separator blades which are placed closely adjacent to each other and which are approximately aligned with the rectilinear dimensions of the potato chips. The blades are guided downwardly into the line of potato chips and tend to penetrate between adjacent ones of the potato chips, usually without creating any breakage or cracking of the potato chips, and once the blades are inserted in the line of potato chips, the blades are moved apart from each other. A plurality of such pairs of separator blades are utilized in the system, so that the blades are continually inserted, parted, and withdrawn from the line of potato chips to continually create the groups of potato chips as the line of potato chips progresses toward the packaging system. A conveying system continuously urges the potato chips on through the system into engagement with the separator blades so that the separator blades also function to establish the rate of movement of the potato chips through the system.

Thus, it is an object of this invention to provide a potato chip processing system which accurately divides a line of edge stacked, nested potato chips or the like into smaller groups of potato chips and to move the groups of potato chips on to a packaging system.

Another object of this invention is to provide a method and apparatus for rapidly and accurately dividing a line of potato chips or the like into smaller groups of potato chips.

Other objects, features and advantages of this invention will become apparent upon reading the following specification, when taken in conjunction with the accompanying drawing.

DETAILED DESCRIPTION

Figures 1, 2:
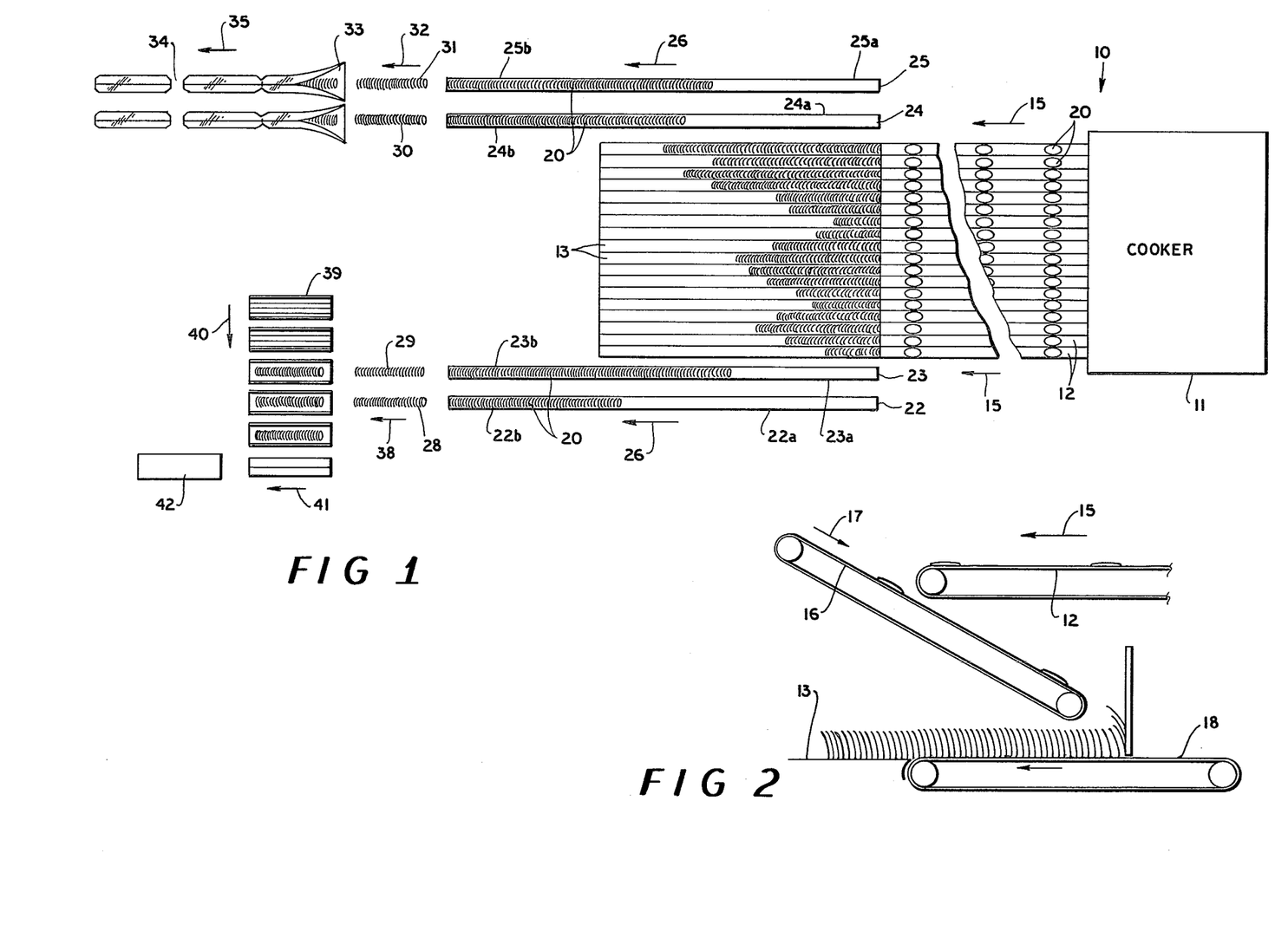
FIG. 1 is a schematic illustration of the overall cooking, processing and packaging system, illustrating one type of packaging system for some of the chips and another type of packaging system for others of the chips.
FIG. 2 is a schematic side view of the shingle stacking mechanism of FIG. 1.

Referring now in more detail to the drawing, in which like numerals indicate like parts throughout the several views, FIG. 1 illustrates a portion of a potato chip processing system 10 which includes a cooker 11, a plurality of conveyors 12, and a work table 13. The uncooked potato chips are formed in a continuous process upstream from the cooker (not shown), and when the potato chips emerge from the cooker they are placed on the relatively fast moving belt conveyors 12. As illustrated in FIG. 2, the potato chips are moved in the direction indicated by arrow 15 on the belt conveyor 12 to a reverse moving stacking conveyor 16 the upper flight of which moves in a downwardly direction as indicated by arrow 17, and the conveyor 16 moves the chips to a slower moving conveyor 18 where they are "shingle stacked" or stacked in abutting, edge standing, nested relationship with respect to each other. The conveyor 18 moves the potato chips onto the work table 13 (FIG. 1).

Figure 6:
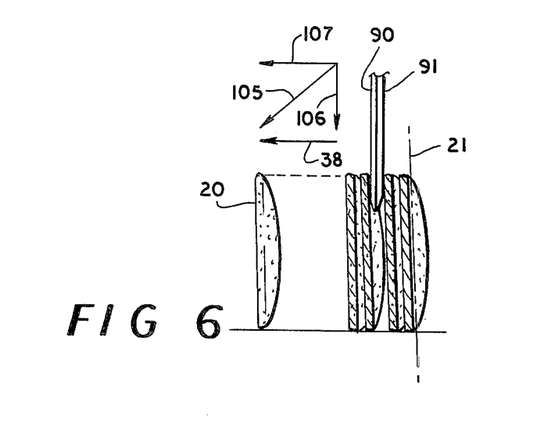
FIG. 6 is a detail schematic illustration of the manner in which the separator blades of the machine penetrate and move with the line of nested, edge standing potato chips.

As illustrated in FIG. 6, the potato chips 20 are approximately the same in size, shape and form. Each potato chip is shaped in an elliptical form, concave on one surface and convex on the opposite surface, and has one rectilinear dimension 21, with the other dimension being curved. The equipment is arranged to form and shingle stack the potato chips in a nested, edge standing relationship so that the rectilinear dimension 21 extends upwardly. Of course, when the potato chips are loosely carried on the conveyor system, the rectilinear dimension 21 of the potato chips will be inclined along the direction of movement, but as the potato chips are more tightly stacked and moved toward the separator, the rectilinear dimension 21 of each of the chips becomes more and more upright, as will be explained more fully hereinafter. Also, the potato chips emerge from the cooker with their concave surface facing upwardly, and the transfer system illustrated in FIG. 2 causes the potato chips to be stacked so that their convex surface faces in the direction of movement of the line of potato chips.

As illustrated in FIG. 1, the potato chips are transferred from the work table 13 to the feed conveyors 22, 23, 24 and 25 which are positioned on opposite sides of the work table. The feed conveyors comprise a vibrating section 22a, 23a, 24a, 25a, respectively at one end and a belt section 22b, 23b, 24b, and 25b at its other section. The vibrator sections 22a—25a are inclined in a downward direction toward the belt sections 22b—25b, so that when the potato chips are first received in the vibrator section they are moved under the influence of gravity in a downward direction toward the belt sections. Each belt section 22b—25b includes a continuously moving belt that has a smooth, substantially slick working surface that urges the potato chips on through the system in the direction as indicated by arrows 26. If the movement of the potato chips is retarded, the belts (not shown) of the belt conveyors 22b—25b continue to move beneath the potato chips and continue to gently urge the potato chips in the direction indicated by arrows 26.

The potato chips are moved from the belt conveyor sections 22b—25b on further through the system by the belt conveyor, and the potato chips are separated into groups or slugs 28, 29, 30 and 31 in the process disclosed in more detail hereinafter. The groups of potato chips are then moved as indicated by arrows 32 and 38 on into a packaging system. The upper portion of FIG. 1 illustrates an in line soft pack packaging system wherein the slugs of potato chips 30 and 31 continue their progressive movement as indicated by arrow 32 on into a packaging system wherein continuous sheet material 33 is moved into engagement with and wrapped about the slugs of potato chips, and the packaging material is cut between the slugs at 34 as the potato chips continue to move on through the system as indicated by arrow 35. Packing systems of this type are known in the prior art, with one such packaging system being identified as the "H-400 Slug Pack" manufactured by Doboy. The other form of packaging the potato chips is illustrated as the lower portion of FIG. 1, wherein the slugs 28 and 29 are continuously fed in the direction as indicated by arrow 38 into open top and open ended receptacles 39. The receptacles 39 include corrugated canister inserts placed therein, and the receptacles are intermittently moved as indicated by arrow 40 into alignment with the moving slugs 28 and 29 to receive the slugs, and the partially completed package is then moved into alignment with a canister 42 and inserted in the direction as indicated by arrow 41 into the canister. This type of packaging system is also known in the prior art.

Figure 3:
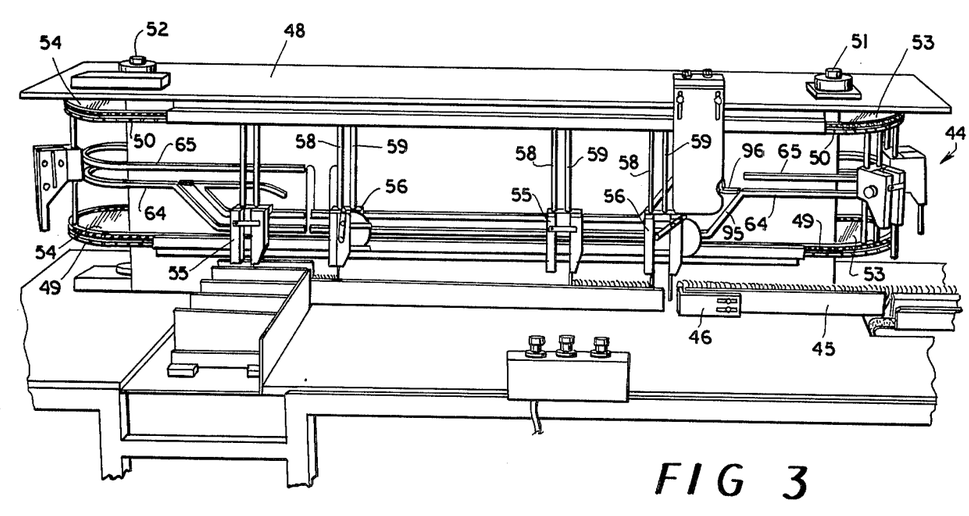
FIG. 3 is a side perspective view of the potato chip separating system.

The potato chip separator 44 shown in FIG. 3 is the type that would be utilized with the canister packaging system and comprises a conveyor housing 45 that is placed in alignment with one of the feed conveyors 22—25 and which tends to guide the oncoming line of edge stacked, nested potato chips into the system. A pair of cam actuated stop plates 46 is placed at the end of the line of oncoming potato chips with its fingers 46a projecting inwardly of the incoming potato chips to block their movement. In the meantime, the smooth conveyor belt of the feed conveyor tends to urge the potato chips on into the fingers 46a.

The potato chip separator includes a housing or framework 48 that is mounted at table top level and which supports lower and upper continuous driving chains 49 and 50. Vertical shafts 51 and 52 carry pairs of sprockets 53 and 54, and the chains 49 and 50 extend around the sprockets.

Potato chip separator assemblies 55 and 56 are arranged in pairs about the framework 48 and are carried by the continuous driving chains 49 and 50. Vertically extending slide bars 58 and 59 are connected at their ends to the chains 49 and 50, and each separator assembly is mounted on a pair of the slide bars 58 and 59, so that each separator assembly 55 and 56 is movable vertically on the slide bars.

Figure 4:
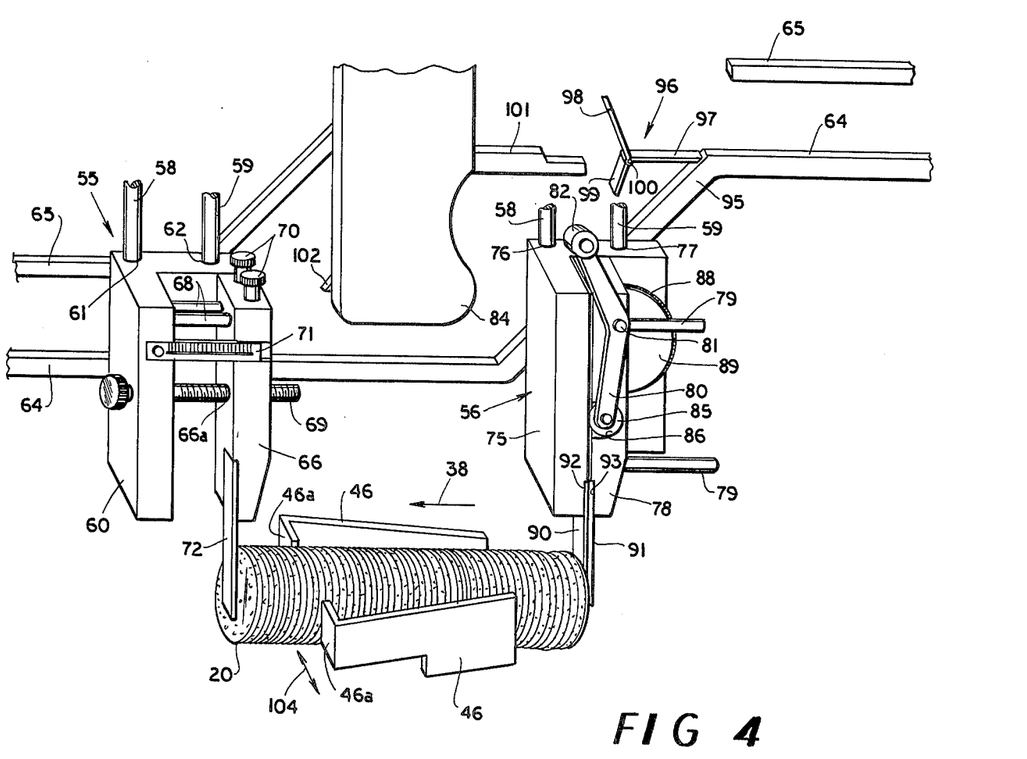
FIG. 4 is a side perspective illustration of a portion of the potato chip separating system, showing a single slug of potato chips.

As illustrated in FIG. 4, the leading separator assembly 55 of the pair of separator assemblies comprises an L-shaped support block 60 which includes a pair of vertically oriented openings 61 and 62 which extend therethrough and which are mounted about the slide bars 58 and 59. A roller (not shown) is rotatably mounted on the back of the support block 60 and is guided about the framework 48 by lower and upper tracks 64 and 65. The tracks 64 and 65 are stationary and are supported by the framework 48. Adjustable block 66 is carried by support block 60. Adjustable block 66 is mounted on one or more guide pins 68 and is spaced from support block 60. Threaded adjusting screw 69 is rotatably supported by support block 60 and its external threads engage the internal threads (not shown) in the opening 66a of adjustable block 66. Set screws 70 are threaded into the adjustable block 66 for frictional engagement with the guide pins 68. Scale 71 is rigidly connected at one of its ends to support block 60, and the indications imprinted thereon can be compared with the edge of adjustable block 66 to determine the spacing between support block 60 and adjustable block 66. Abutment blade 72 is rigidly connected at its upper end to adjustable block 66 and extends vertically downwardly therefrom.

The second separator assembly 56 also comprises an L-shaped support block 75 which defines a pair of openings 76 and 77 extending vertically therethrough and which surround the slide bars 58 and 59. A roller (not shown) is rotatably mounted on the back side of the support block 75 and rides between the tracks 64 and 65 of the framework 48. A movable block 78 is carried by the support block 75. Guide pins 79 are each rigidly connected at one of their ends to the support block 75 and the movable block 78 rides on the guide pins toward and away from the support block 75. Cam actuated lever 80 is pivotally connected at 81 intermediate its ends to the movable block 78, and its cam roller 82 at its upper end is engaged by the cam surface 84. The lower end of the lever 80 includes roller 85 that is normally maintained within roller recess 86. When the cam roller 82 engages the cam surface 84 (FIG. 5), the lever rotates in a clockwise direction about its pivot pin 81, causing the lower roller 85 to move out of its recess 86 and push against support block 75. This causes the movable block 78 to move along guide pins 79 away from the support block 75. A coil tension spring 88 extends about a semicircular guide 89, and the opposite ends of the spring 88 are both connected to the support block 75 while the guide 89 is rigidly mounted on the movable block 78. Thus, coil tension spring 88 continuously urges the movable block 78 toward the support block 75, to the position illustrated in FIG. 4.

A pair of separator elements or blades 90 and 91 are connected at their upper ends to the lower portions of support block 75 and to the movable block 78, respectively. The separator elements 90 and 91 are in the form of pointed blades, and blade 90 is rigidly connected at its upper end in the recess 92 of support block 75 while the blade 91 is rigidly connected at its upper end in the recess 93 of movable block 78. As illustrated in FIG. 6, the lower ends of the blades 90 and 91 are tapered inwardly so that when the blades are in juxtaposition as illustrated in FIGS. 4 and 6, the blades form a pointed instrument.

As illustrated in FIG. 3, the tracks 64 and 65 extend entirely around the framework 48 of the potato chip separator 44 and function to continuously guide each of the potato chip separator assemblies 55 and 56. The tracks 64 and 65 have two levels, with a higher level extending around the back side of the framework (not shown), and with a lower level extending along the middle portion of the front side of the framework. As illustrated in FIG. 4, the lower track 64 turns downwardly from its upper level with its inclined section 95 toward its lower section. A transfer lever 96 is located at the beginning of the downwardly inclined section 95 of the lower track 64 and comprises a receiving arm 97, a delivery arm 98, and a return arm 99. The transfer lever is pivotally mounted on the framework 48 by means of pivot pin 100. As the roller (not shown) mounted on the back side of the potato chip separator assembly 55 moves along the lower and upper tracks 64 and 65 toward the downward inclined section 95 of the lower track 64, it will be received on the receiving arm 97 of the transfer lever, so that its horizontal motion will continue. As the roller (not shown) mounted on the back of the separator assembly 55 engages delivery arm 98, it tends to pivot the transfer lever in a counterclockwise direction so that the delivery arm 98 moves downwardly into engagement with the lower track extension 101, thereby allowing the first potato chip separator assembly 55 to continue in a horizontal direction beyond the downwardly inclined track section 95. The lower track extension 101 subsequently turns to a downward incline at 102, and the upper and lower track sections then guide the first potato chip assembly 55 down the incline 102 to the lower level of the tracks 64 and 65. In the meantime, the second separator assembly 56 approaches the downwardly inclined portion 95 of the lower track section 64 and engages the now upwardly extending receiving arm 97 which urges the roller in a downward direction, and the roller eventually engages the return arm 99 which is projecting out into the path of the roller. The roller tends to urge the return arm and therefore the transfer lever 96 in a clockwise direction so that the transfer level reassumes the position indicated in FIG. 4 while the second potato chip separator assembly 56 moves down the inclined section 95 of the lower tract 64.

The cam actuated stop plates 46 move back and forth, toward and away from each other, as indicated by arrow 104, to alternately block the movement of the potato chips 20 along their direction of movement as indicated by arrow 38. The cam control system (not shown) which causes the movement of the fingers 46 is operated by the drive system of the potato chip separator, and the fingers are maintained in a closed position until the first potato chip separator assembly 55 has moved down the incline of the tracks 64 and 65 to a low position where its abutment blade 72 is located in front of the leading end of the line of potato chips 20. As soon as the abutment blade is properly positioned in front of the line of potato chips, the cam actuated stop fingers 46 separate and allow the potato chips to move in the direction indicated by arrow 38 under the influence of the belt conveyor 22b. The belt conveyor 22b is operated at a speed which is somewhat faster than the movement of the separator assembly 55, so that the abutment 72 establishes the velocity of movement of the line of potato chips through the system.

The separator assemblies 55 and 56 move at the same horizontal velocity throughout the entire system since all of the assemblies and mounted on the continuous chains 49 and 50. Thus, when the second separator assembly 56 moves down the inclined portion 95 of the track 64, its separator blades 90 and 91 will be moving with a horizontal velocity component that is approximately equal to the velocity of the moving potato chips. As illustrated in FIG. 6, the potato chips will move with a horizontal velocity component 38 which is approximately equal to the horizontal velocity of the first separator assembly 55, while the second separator assembly 56 will move with a downwardly inclined velocity 105 that has a vertical component 106 and a horizontal component 107. The horizontal component of velocity 107 is approximately equal to the horizontal velocity 38, which causes the separator blades 90 and 91 to enter the line of potato chips with a relative movement indicated by velocity component 106, which is substantially vertical. Since the rectilinear dimension 21 of the potato chips are oriented in an upward direction which is substantially vertical, the blades 90 and 91 enter with their longitudinal dimensions extending approximately parallel to the rectilinear dimensions of the potato chips, so that substantially no damage is experienced by the potato chips upon the entry of the blades 90 and 91. Since lower edges of the blades 90 and 91 are beveled toward each other and are maintained in juxtaposition during their entry movement, the blades enter between adjacent ones of the potato chips 20.

Figure 5:
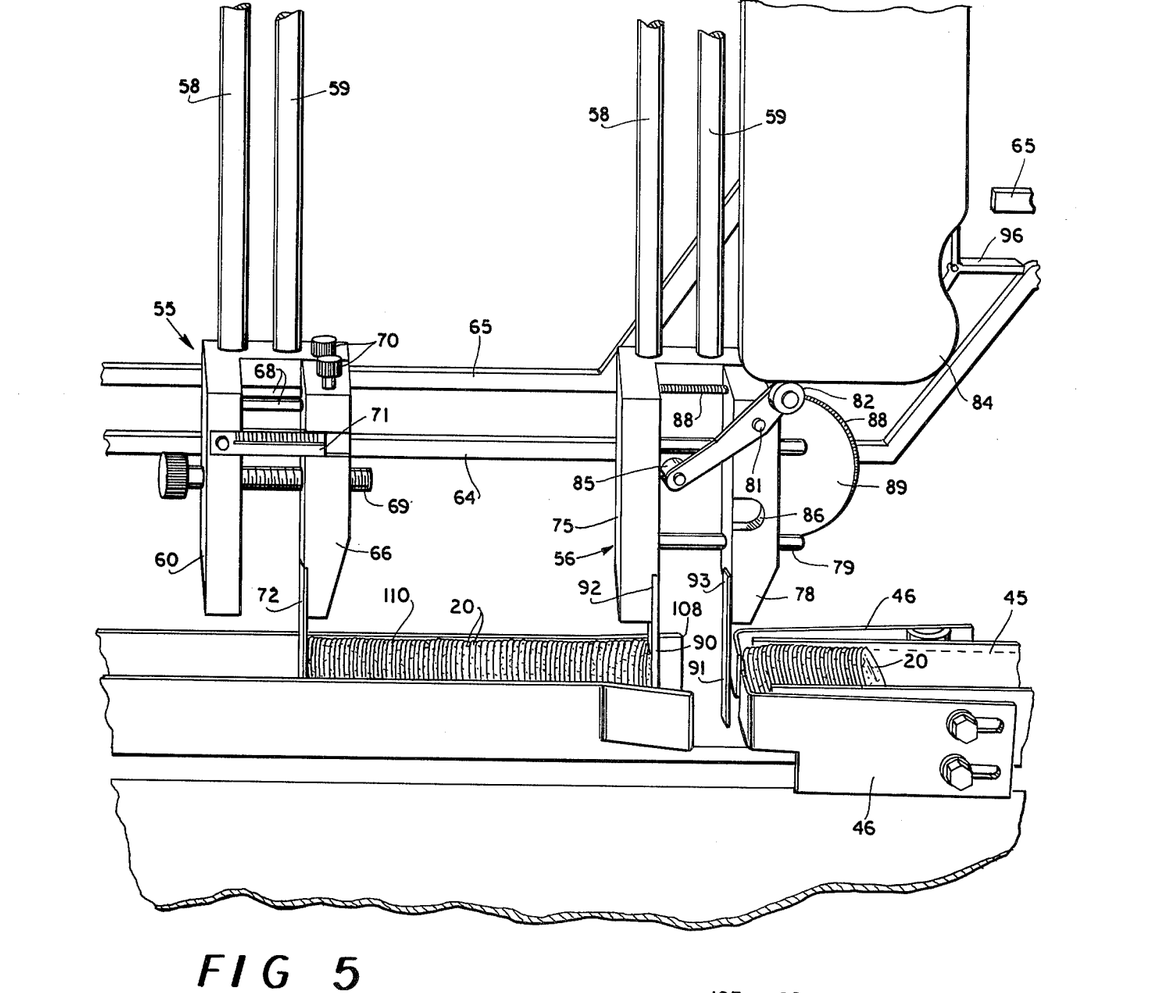
FIG. 5 is a side perspective view of the potato chip separating system, similar to FIG. 4, but illustrating the separator blades moved apart from each other.

As illustrated in FIG. 5, the movement of the second separator assembly 56 beneath the cam surface 84 causes the cam roller 82 to engage the surface, be moved downwardly by the surface, and the movable block 78 then moves away from the support block 75. The separator blades 90 and 91 which are carried by the blocks 75 and 78 thereupon move apart in directions extending along the line of potato chips, to create a space 108 in the potato chips, and to form a group or slug 110 of potato chips. The cam control arrangement (not shown) of the fingers 46 causes the fingers 46 to move back toward each other just after the leading separator blade 90 passes the end of the fingers 46 and prior to the movement of the subsequent blade 91 past the fingers 46. The fingers 46 therefore reach into the path of the oncoming line of potato chips and prevent the movement of the leading end of the line of potato chips to move beyond the fingers. In the meantime, the separator assemblies continue in their movement on through the system toward the canister loading system. When another pair of separator assemblies 55 and 56 reach the fingers 46, the procedure is repeated.

Figure 7:
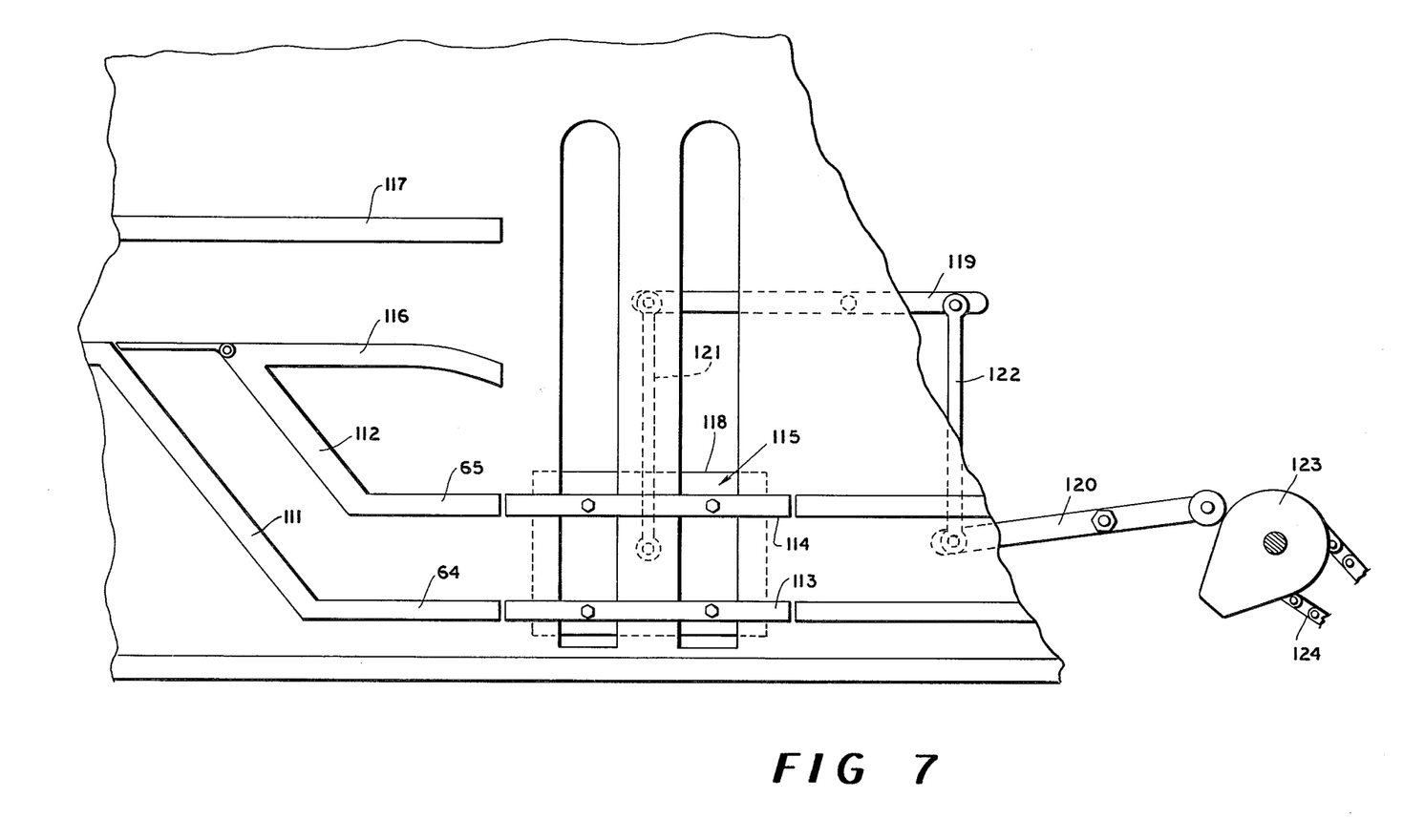
FIG. 7 is a side elevational view, with parts broken away and with parts shown in dashed lines, of the cam elevator of the form of the invention shown in FIGS. 4 and 5.

When the slugs 110 of potato chips are moved to the loading assembly, it is desirable to move the leading separator assembly in an upward direction in order to withdraw the leading abutment blade 72 from the vicinity of the potato chips and the associated equipment, and it is required that the oncoming separator blades 90 and 91 be moved upwardly at a different location on the tracks 64 and 65 so that they do not tend to push the potato chips on through the loading assembly. As illustrated in FIG. 7, the lower and upper tracks 64 and 65 include upwardly inclined sections 111 and 112 for guiding the first separator assembly assembly upwardly to the upper track level. Horizontal track sections 113 and 114 are connected to an elevator assembly 115, and the elevator assembly oscillates up and down to move the track sections 113 and 114 up into and out of registration with the track extension 116 and 117. The elevator assembly 115 includes slide block 118 which is connected to levers 119 and 120 by connecting rods 121 and 122. Cam 123 is driven by a chain drive 124 that is connected to the drive system (not shown) for the potato chip separator, and the cam eccentric operates the levers and therefore the slide block 118 so as to elevate the track sections 113 and 114 between their lower positions as shown in FIG. 7 to their upper position where the track sections 113 and 114 register with the track extensions 116 and 117. The system is timed so that the track sections 113 and 114 begin to elevate as the second potato chip separator assembly 56 comes on the track section 113 and 114, so that the separator blades 90 and 91 clear the slug of potato chips that it delivered to the packaging system. As illustrated in the lower portion of FIG. 1, the receptacles for the packaging system are indexed as indicated by arrow 40 as each slug of potato chips is delivered to an empty receptacle.

Figure 8:
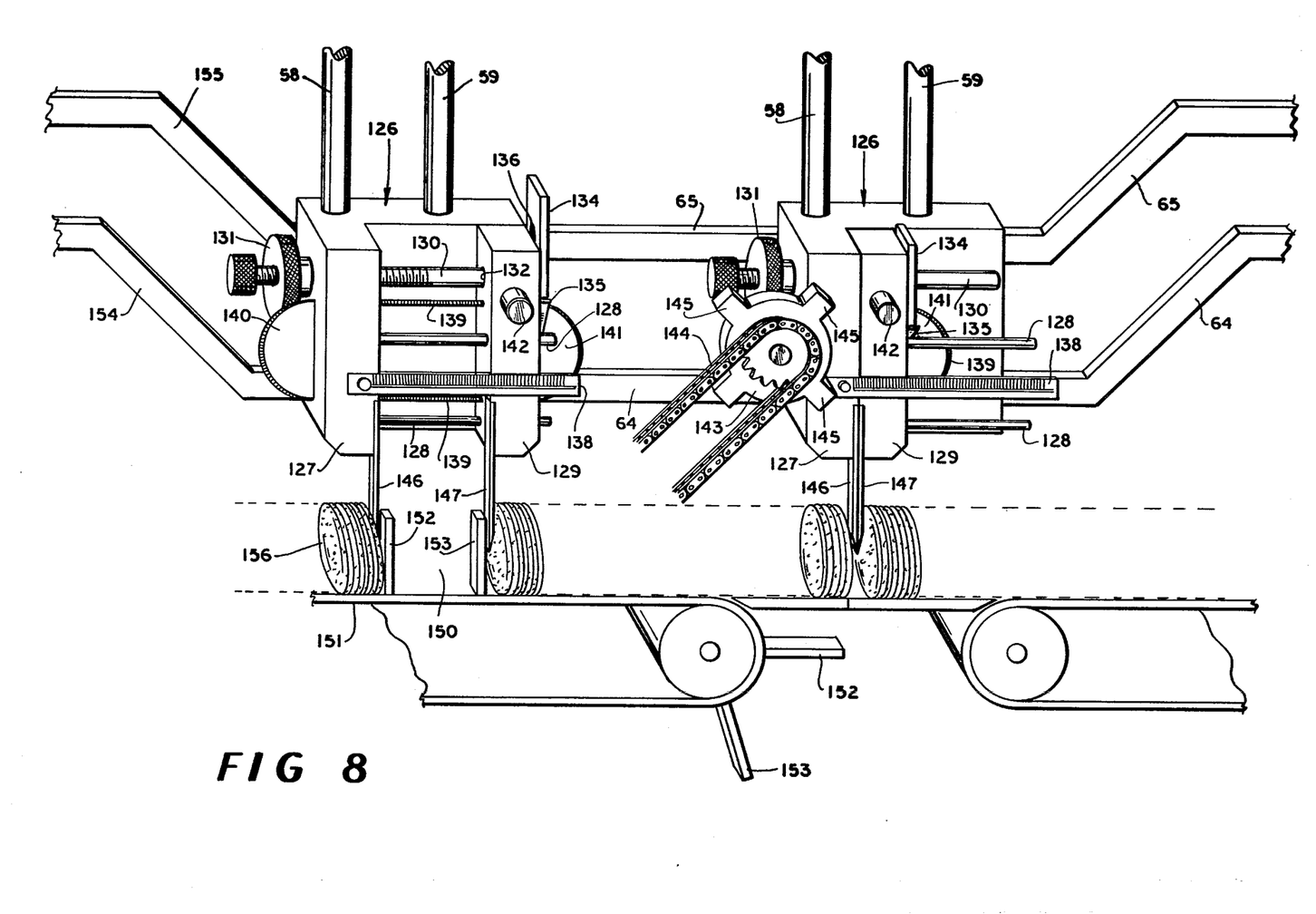
FIG. 8 is a side perspective view, of a portion of the potato chip separating system, but showing another embodiment of the invention.

The upper portion of FIG. 1 illustrates an in line packaging system, and the potato chip separator is modified to be compatible with such a system. As illustrated in FIG. 8, the in-line separator system includes identical first and second potato chip separator assemblies, with each separator assembly 126 comprising an L-shaped support block 127 vertically slidably mounted on the slide rods 58 and 59, guide pins 128 rigidly connected at one of their ends to support block 127 and movable block 129 slidably mounted on the guide pins 128. A positioning pin 130 extends through support block 127 and is externally threaded in its portion passing therethrough, and lock nut 131 also is threaded onto the positioning pin adjacent the support block 127. Movable block 129 defines an opening 132 therein which registers with the positioning pin 130, and the movable block 129 can move along the positioning pin. Latch 134 is slidably mounted on movable block 129 so that it can move vertically thereon, and leaf spring 135 continuously urges latch 134 in an upward direction. A hole 136 is formed in the latch 134. When the latch 134 is urged in a downward direction against the bias of leaf spring 135, the hole 136 will register with the move about positioning pin 130, which allows the movable block 129 to move about the positioning pin toward or away from the support block 127. When the movable block 129 is moved to its outer position as indicated in the left portion of FIG. 8, and the latch moves beyond the end of the positioning pin, the leaf spring 135 will urge the latch 134 upwardly so as to move the hole 136 of the latch out of registration with the positioning pin 130, so that the movable block 129 cannot move toward the support block 127.

A scale 138 is rigidly connected at one of its ends to support block 127 and the indicia on the scale indicates the distance that movable block 129 is held away from support block 127. If the distance between the two blocks should be altered, the lock nut 131 can be loosened, the positioning pin 130 rotated to partially withdraw it from or extend it further through support block 127, and the lock nut 131 retightened.

Coil tension spring 139 extends through openings in both support block 127 and movable block 129 and about the semicircular spring guides 140 and 141 on the outer surfaces of the blocks, and the spring continuously urges the blocks together to the position illustrated in the right portion of FIG. 8.

A cam protrusion 142 is connected to movable block 129, and the cam actuator sprocket 143 is located in the path of movement of the cam protrusion. The cam actuator sprocket 143 is progressively driven by cam chain 144, and the cam chain 144 is driven in timed relation with the other elements of the system so that the sprocket protrusion 145 extending from the sprocket 143 move at approximately one-fourth speed of the system. When a cam protrusion 142 engages a protrusion 145 of the sprocket 143, the movement of the movable block 129 along the tracks 64 and 65 will be retarded so as to progressively open the blocks apart, and separator blades 146 and 147 move apart from each other. When the movable block 129 is moved far enough away from the support block 127, the latch 134 will move beyond the end of positioning pin 130, and leaf spring 135 will flip the latch 134 up so that its hole 136 will be out of registration with the positioning pin. When the separator assembly moves beyond the cam actuator sprocket 143, the separator assembly will be latched to its open position as indicated in the left portion of FIG. 8.

Rollers (not shown) are rotatably mounted on the backs of the support block 127, and the lower and upper tracks 64 and 65 guide the separator assemblies about the framework of the system as described previously. When the separator assemblies of FIG. 8 move down the incline of the tracks, the separator blades 146 and 147 penetrate the line of potato chips in the manner indicated in FIG. 6, so that virtually no breakage or deterioration of the potato chips is experienced. When the separator blades 146 and 147 are moved apart with the cam actuator sprocket 143, a space 150 is formed between adjacent ones of the potato chips, to form groups or slugs 151 of potato chips. The separator blade 147 thus becomes a moving abutment for the line of potato chips and the next following separator assembly and limits the velocity of movement of the line of chips even though the line is urged by the conveyor belt at a velocity faster than the velocity of the separator assemblies.

After the spaces 150 have been formed in the line of potato chips, the potato chips are moved onto packaging conveyor 151. Pins 152 and 153 are mounted on the packaging conveyor 151, and the spacing between adjacent ones of the pins 152 and 153 is slightly less than the spaces formed between the separator blades 146 and 147. The timing of the system causes the separator blades 146 and 147 to register on the outside of the pins 152 and 153, so that the space 150 between the slugs of potato chips is located on opposite sides of the pins 152 and 153. The pins 152 and 153 therefore become separators of the conveyor belt 151 and function to maintain the ends of the groups or slugs of potato chips, and the separator blades 146 and 147 of the potato chip separator can then be withdrawn upwardly from the line of potato chips and recycled in the system while the conveyor 151 continues to move the slugs of potato chips on through the packaging machine.

The upwardly inclined sections 154 and 155 of the tracks 64 and 65 move the separator assemblies up to the higher track level, where the separator assemblies repeat their function. A stationary cam actuator (not shown) is located adjacent the path of the separator assemblies and engages the latch 134 of each separator assembly, causing the latch 134 to move in a downward direction and cause its opening 136 to register with the positioning pin 130, whereupon the spring 139 causes the movable block 129 to move back toward the support block 127. This causes the separator assembly to be ready for its next cycle of operation.

While this invention has been described as a process and apparatus for separating and otherwise processing potato chips, it will be understood by those skilled in the art that the process and apparatus can be utilized with other products, and that the term "potato chip" should be broadly construed to include other products. Moreover, while this invention has been described in detail with particular reference to preferred embodiments thereof, it will be understood that variations and modifications can be effected within the spirit and scope of the invention as described hereinbefore and as defined in the appended claims.

I claim:

1. A method of separating a series of shingle stacked edge standing aligned products each with an upwardly extending rectilinear dimension into groups of aligned products comprising moving an abutment along a horizontal path extending along the length of the aligned products at a predetermined velocity, urging the aligned products along the path at a velocity greater than the predetermined velocity in the same direction in which the abutment moves so that the abutment limits the velocity at which the products move along the path and the products are continuously urged into their shingle stacked edge standing relationship, moving a pair of juxtaposed separating elements at a velocity having a horizontal component approximately the same along the path as the velocity of the abutment along the path, inserting the pair of juxtaposed separating elements downwardly into the series of aligned articles between adjacent ones of the articles as the juxtaposed separating elements continue to move with a horizontal component of velocity approximately the same along the path as the velocity of the abutment along the path and as the products are continuously urged into their shingle stacked edge standing relationship, and continuing to move a first one of the separating elements along the path at the same velocity while temporarily reducing the velocity of a second one of the separating elements to form a space in the series of products whereby the second separating element becomes the abutment for the oncoming series of products.

2. In a process of forming groups of potato chips and the like wherein the potato chips are all substantially the same shape with each having at least one approximately rectilinear dimension comprising aligning and nesting the potato chips with one another in a horizontal series of abutting potato chips with their approximately rectilinear dimensions oriented in an upward direction, continuously urging the series of abutting potato chips along a path coextensive with the alignment of the potato chips into a moving abutment, moving a pair of vertically oriented juxtaposed separating blades along the path with a horizontal velocity component approximately equal to the horizontal velocity of the potato chips, inserting the pair of separating blades downwardly between adjacent ones of the potato chips as the separating blades continue to move with a horizontal velocity component approximately equal to the horizontal velocity of the potato chips, and moving the pair of separating blades apart.

3. The process of claim 2 and further including the step of withdrawing the separating blades upwardly from between the potato chips while the separating blades are still spaced apart from each other.

4. The process of claim 2 and further including the step of moving the groups of potato chips onto a moving conveyor surface with separating means carried by the conveyor, with the pair of separating blades located on opposite sides of the conveyor separating means.

5. In a process of packaging potato chips or the like having approximately the same shape and each having at least one rectilinear dimension comprising arranging the potato chips in nested alignment with one another with their rectilinear dimensions extending upwardly, placing in abutment at the head of the line of potato chips and moving the abutment along a path parallel to the length of the line of nested potato chips away from the potato chips, urging the line of nested potato chips along its length toward the moving abutment at a velocity faster than the velocity of the moving abutment so that the moving abutment limits the rate of movement of the line of potato chips, moving a pair of flat abutting separating blades along the path of movement of the potato chips at a velocity parallel to the path which is approximately equal to the velocity of the abutment, inserting the pair of separating blades downwardly into the line of potato chips between adjacent ones of the potato chips as the separating blades continue to move with a velocity parallel to the path which is approximately equal to the velocity of the abutment along the path, continuing to move a first one of the separating blades at approximately the same velocity as the moving abutment and moving the second one of the separating blades at a slower velocity while the first and second separating blades are in the line of potato chips to open a gap in the line of potato chips.

6. The process of claim 5 and further including the step of moving the potato chips with the moving abutment and the first separator element onto a moving conveyor, and lifting the moving abutment and first one of the separator elements away from the potato chips.

7. Apparatus for packaging potato chips and the like comprising an abutment, drive means for moving said abutment along a horizontal path at a predetermined velocity, conveyor means movable along the path beneath said abutment at a faster velocity than said abutment for moving and maintaining potato chips in edge-standing engagement with said abutment along the path, separating means engageable with the potato chips as the potato chips are moved by said conveyor for forming spaces between some of the potato chips, said separating means comprising a pair of blade members movable in juxtaposed relationship along the length of said conveyor, said drive means including means for moving said pair of blade members along the path with a horizontal component of velocity approximately equal to the horizontal velocity of said abutment, means for simultaneously moving said pair of blade members downwardly to project into the potato chips as the blades continue their movement along the path, means for moving the blade members apart from each other along the length of movement of the potato chips, and means for withdrawing the blade members from the potato chips.

* * * * *